Figure 1:
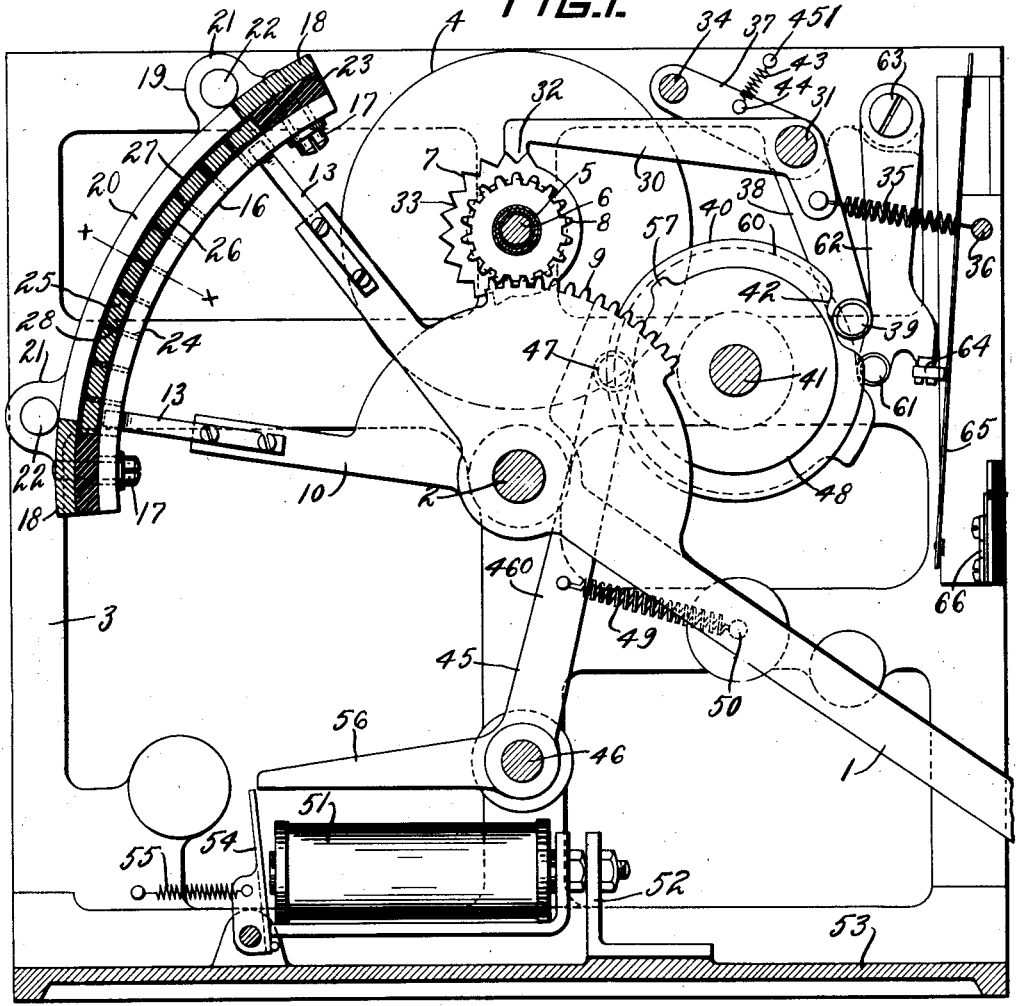

M. M. GOLDBERG.
DISTANT ACCOUNTING MECHANISM.
APPLICATION FILED APR. 11, 1914.

1,166,517.

Patented Jan. 4, 1916.
7 SHEETS—SHEET 1.

Witnesses
H. W. Lindley Jr.
H. F. Sadgebury

Inventor
Maximilian M. Goldberg
by R. Elsass.
Earl Beust
Attorneys

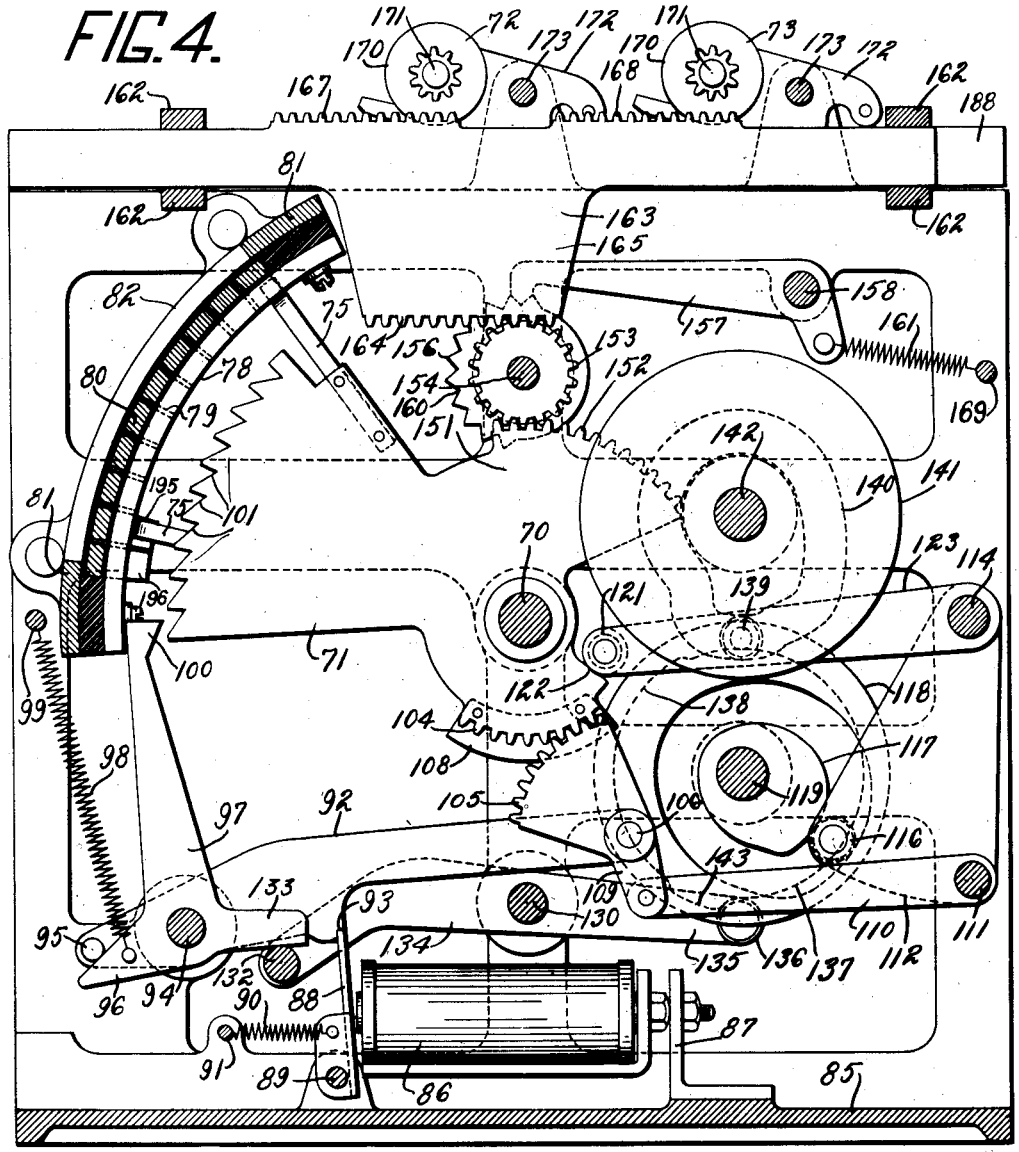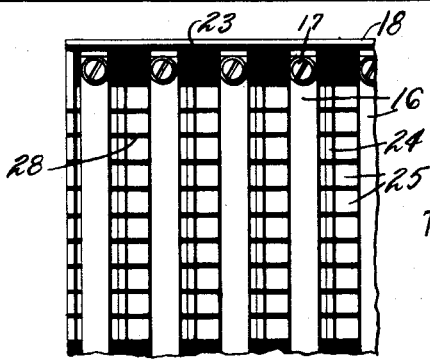

M. M. GOLDBERG.
DISTANT ACCOUNTING MECHANISM.
APPLICATION FILED APR. 11, 1914.

1,166,517.

Patented Jan. 4, 1916.
7 SHEETS—SHEET 3.

Witnesses
H. W. Lindsey Jr.
H. F. Sadgebury

Inventor
Maximilian M. Goldberg
by R. W. Ross
Carl Beust
Attorneys

M. M. GOLDBERG.
DISTANT ACCOUNTING MECHANISM.
APPLICATION FILED APR. 11, 1914.

1,166,517.

Patented Jan. 4, 1916.
7 SHEETS—SHEET 4.

Witnesses
F. W. Lindsey Jr.
H. F. Sadgebury

Inventor
Maximilian M. Goldberg
by R. C. Wess
Carl Beust
Attorney

M. M. GOLDBERG.
DISTANT ACCOUNTING MECHANISM.
APPLICATION FILED APR. 11, 1914.

1,166,517.

Patented Jan. 4, 1916.
7 SHEETS—SHEET 6.

Witnesses
H. W. Lindsey Jr.
H. F. Sadgebury

Inventor
Maximilian M. Goldberg
by R. A. Glaser
Carl Beust
Attorneys

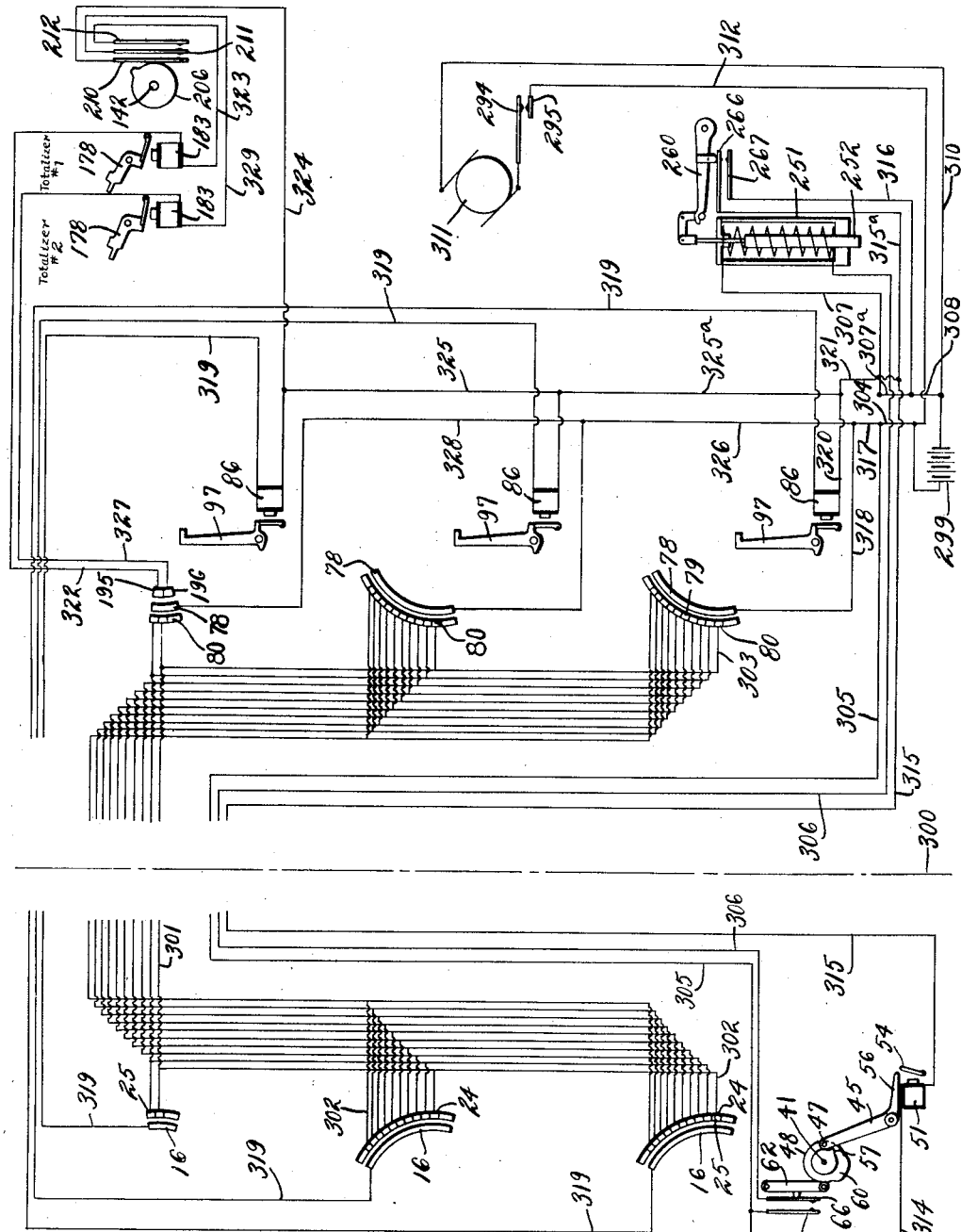

UNITED STATES PATENT OFFICE.

MAXIMILIAN M. GOLDBERG, OF DAYTON, OHIO, ASSIGNOR TO THE NATIONAL CASH REGISTER COMPANY, OF DAYTON, OHIO, A CORPORATION OF OHIO, (INCORPORATED IN 1906.)

DISTANT ACCOUNTING MECHANISM.

1,166,517. Specification of Letters Patent. Patented Jan. 4, 1916.

Application filed April 11, 1914. Serial No. 831,313.

*To all whom it may concern:*

Be it known that I, MAXIMILIAN M. GOLDBERG, a citizen of the United States, residing at Dayton, in the county of Montgomery and State of Ohio, have invented certain new and useful Improvements in Distant Accounting Mechanism, of which I declare the following to be a full, clear, and exact description.

This invention relates to improvements in registering systems, in which the manipulation of one machine which may be called the sending machine, electrically controls at a distance the operation of another machine which, for convenience, may be called the receiving machine.

The general object of this invention is to provide an improved system of electric wiring whereby the use of a number of wires, which extend from the sending machine to the receiving machine and are sufficient for one bank of controlling contacts of the sending machine, may be employed at the same time for any number of different denominational banks of controlling contacts, each bank of the sending machine having its own common return wire from the receiving machine so that it may control the extent of movement of an element of the corresponding denomination in the receiving machine, all of these elements being operated simultaneously.

Heretofore a set of wires extending from each bank of contacts of the sending machine to a corresponding bank of contacts of the receiving machine has been considered the minimum in this class of machine. The provision of one wire besides the common return wire for any number of banks of controlling contacts is also old in the art, but in the machine to which this wiring is applied, the denominational elements of the receiving machine are operated successively, instead of simultaneously, as in the present invention. It is obvious that the employment of one set of wires for any number of bank controlling contacts, instead of one set of wires for each bank of controlling contacts is a very great advantage, as it materially decreases the cost, as well as simplifies the wiring of the system. The simultaneous actuation of the denominational elements of the receiving machine, instead of a successive operation, is also a very important advantage as the operation of the system requires considerably less time.

Another object of the invention is to construct the differential mechanism of the receiving machine so that it may be positively operated by the operating mechanism of the receiving machine under the control of the sending machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 2:
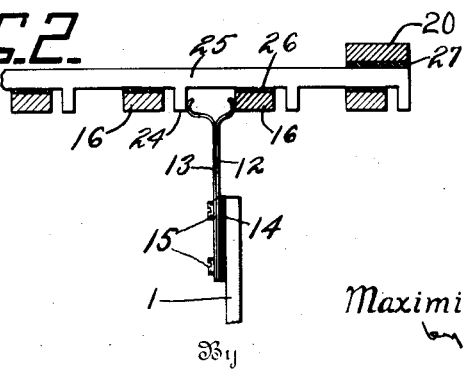
Figure 5:
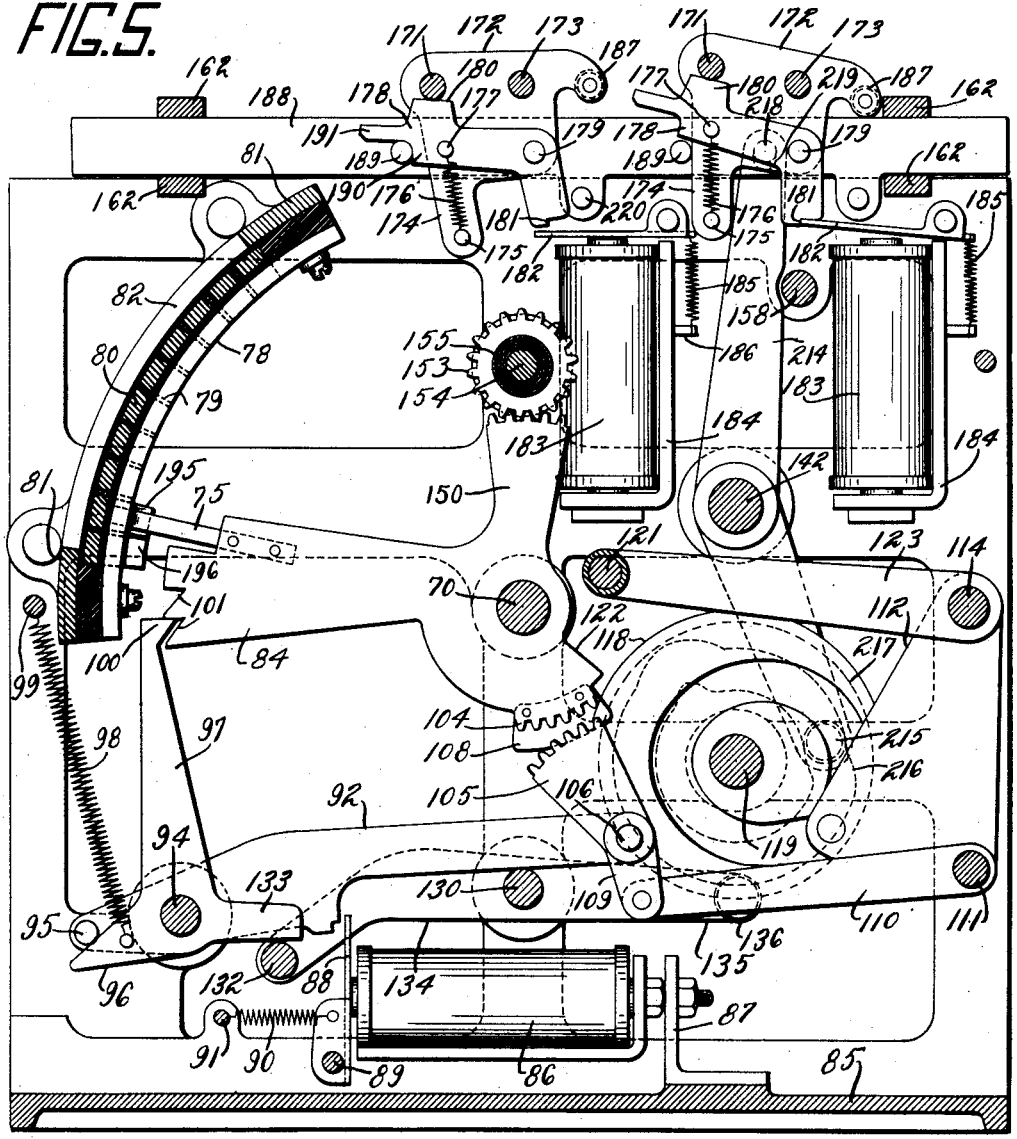
Figure 6:
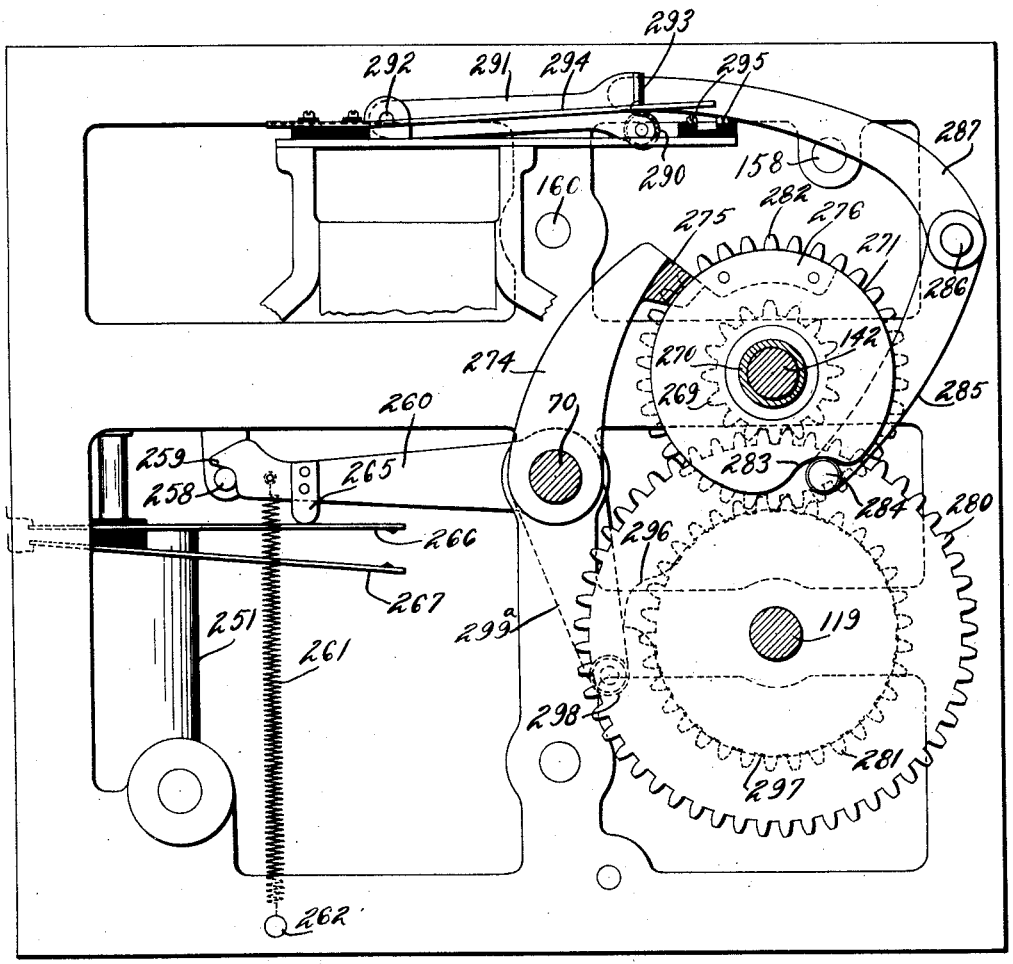
Figure 7:
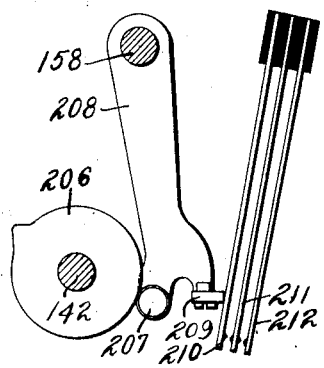
Figure 8:
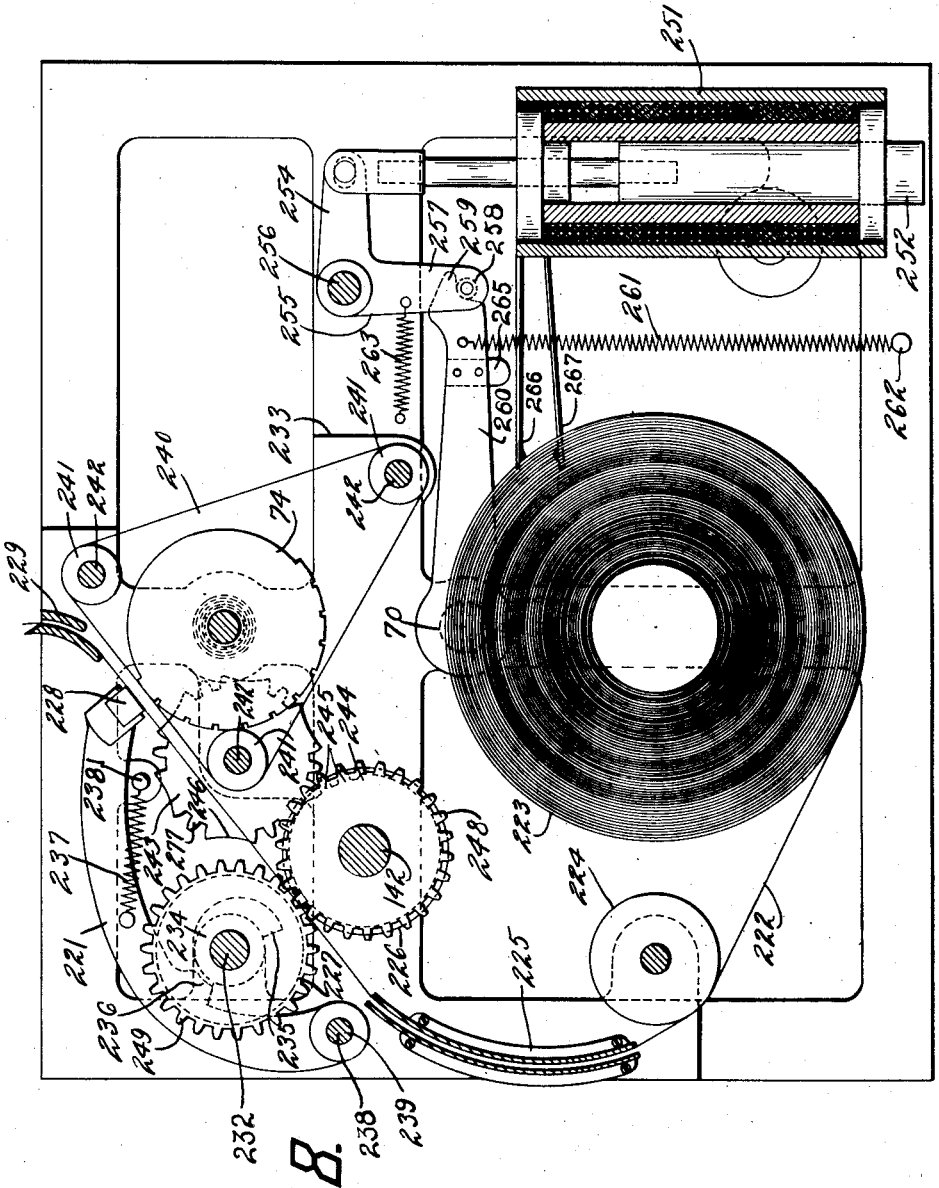
Figure 9:
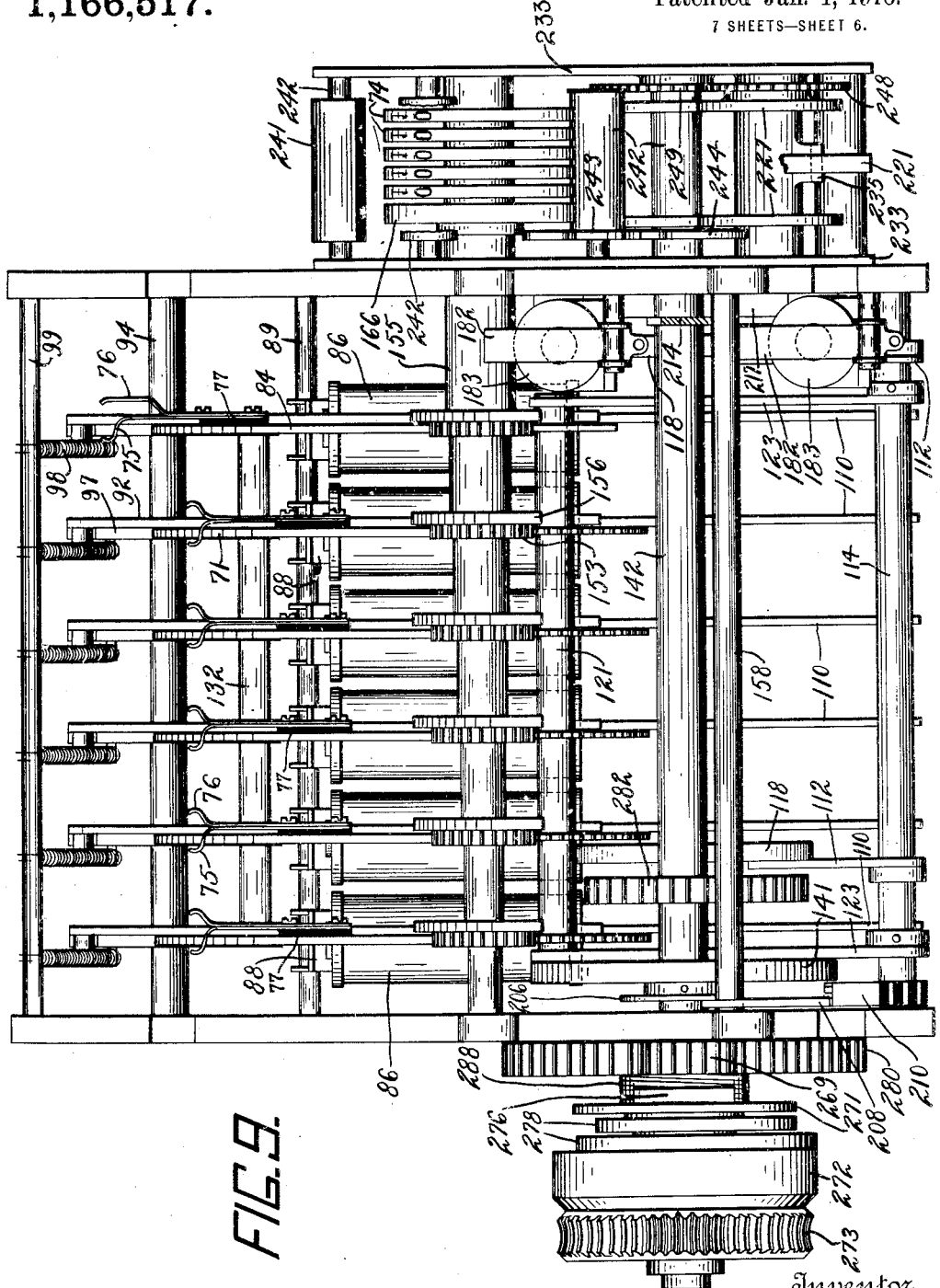

Of said drawings Figure 1 is a transverse vertical section taken through the sending machine. Fig. 2 is a detailed cross sectional view through the stationary contact making frame of the sending machine taken between the insulating material and a common horizontal contact bar as on the line X—X, Fig. 1, and shows the contact strips carried by one of the manually adjustable determining levers of the sending machine. Fig. 3 is a reduced rear view of a portion of the contact making frame shown in Fig. 2. Fig. 4 is a transverse vertical section taken near the right hand side frame of the receiving machine and showing the mechanism thereof in normal position. Fig. 5 is a transverse vertical section taken through the receiving machine near its left hand side showing the totalizer selecting mechanism in operated position. Fig. 6 is a detailed view showing the motor locking mechanism and the motor circuit closing device, the motor being broken away for the sake of clearness. Fig. 7 is a detailed view showing the totalizer switch and the cam for closing the same. Fig. 8 is a side elevation of the printing mechanism for the receiving machine, and shows in section the electrical magnet employed to control the devices shown in Fig. 6. Fig. 9 is a top plan view of the receiving machine with totalizers, their actuating racks, the motor, the alining pawls for the differential mechanism, and the contact making frame removed. Fig. 10 is a diagrammatic view of the various electric circuits and connections.

For the purpose of setting forth, in a general way, the construction of the devices which have been specifically adopted to carry out the broad objects mentioned above, it may be stated that the sending machine comprises a series of manually adjustable setting levers, one for each bank of controlling contacts, and these levers carry certain contact making devices which establish contacts between contact bars, one for each lever, and contact bars, one for each position of adjustment of the setting levers and common to the setting levers. The common contact bar for each setting lever, and the contact points, for the particular lever on the contact bars common to the various levers, will, for the sake of convenience be called herein a "bank of contacts". When the sending machine is operated by the turning of a crank handle, or other suitable means, this results in the closing of a circuit through a motor connected to the driving shaft of the receiving machine so as to operate the latter. During the operation of the receiving machine, differentially movable segmental members, called herein "actuating segments", and corresponding to the setting levers of the sending machine, are positively driven by the operating mechanism of the receiving machine, and when these actuating segments reach positions corresponding to the position of the corresponding setting levers of the sending machine contacts are made to establish circuits through corresponding contact bars in the receiving machine. The making of such contacts at the receiving machine results in electric magnets being energized to stop and lock the actuating segments in positions corresponding to the differential extents of movement of the respective setting levers of the sending machine. These actuating segments of the receiving machine are designed to actuate type carriers and actuating racks for totalizers to a corresponding extent.

The receiving machine is provided with a plurality of independent totalizers which are normally out of operative position with their actuating racks, and any one of these totalizers may be thrown into operation, as predetermined by the position of a special counter selecting lever of the sending machine. In the preferred form of embodiment shown in the drawings, but two totalizers are employed, but it is to be understood that it is not intended to limit the invention for actuating but two totalizers as it will be evident from the following description that any number of totalizers might be used. After a printing impression has been taken from the positioned type carriers of the receiving machine and after the selected totalizer has been engaged with the positioned actuating racks, the actuating segments, and therefore, the racks, are restored to normal position to actuate which ever totalizer is in engagement with the racks. Provision is also made for unlocking the receiving machine from the sending machine, and the setting levers of the sending machine are automatically locked until the receiving machine has completely finished its operation.

Having described the general operation of the machine, the specific arrangement of the parts will now be described in detail.

*Sending machine.*—The sending machine shown in Fig. 1 is provided with a series of manually adjustable setting elements or levers 1, which are loosely mounted upon a central shaft 2 suitably supported in the side frames 3 of the machine. These levers move over any ordinary form of scale (not shown but at the right in Fig. 1) on the front of the machine so as to be set differentially to any desired point, according to the amount to be registered in the receiving machine. For convenience in setting the levers 1 to their desired positions, numeral bearing indicator wheels 4 are provided. Each indicator wheel is rigidly mounted upon a corresponding sleeve 5, rotatably mounted upon a transverse shaft 6, the right hand indicator wheel being fast upon this shaft. A disk 7 and pinion 8 are rigidly mounted on each of the sleeves and the shaft. The pinion 8 for each indicator wheel is arranged to constantly mesh with the teeth 9, which are arranged concentrically about the shaft 2, and on the central portion of its respective setting lever, so that when any setting lever is adjusted its respective indicator moves simultaneously to indicate the position of the lever, and in this manner assists the operator in properly adjusting the lever to its desired position.

In addition to the ordinary amount setting levers 1, a special counter selecting lever 10 is provided. This selecting lever 10, as shown in Fig. 1 of the drawing, is similar to the amount setting levers, except that it has but two positions of adjustment for selecting one or the other of the two totalizers of the receiving machine for operation, and therefore, it also has fewer teeth for meshing with the pinion 8 of its corresponding indicator wheel. It is to be understood, of course, that the receiving machine may be supplied with any number of totalizers and that the selecting lever 10 of the sending machine will have as many setting positions as there are totalizers.

Upon the left hand side of the rear end of each setting lever 1 and special lever 10 is a pair of spring contact strips 12 and 13 (Fig. 2) which are separated from the lever by an insulating strip 14, the contact strips being attached to the levers by screws 15, which are also suitably insulated from the levers. The contact strip 12 for each lever is always in contact with the right hand side of its respective common contact bar 16; which is concentrically arranged about the shaft 2 (Figs. 1, 2 and 3). There is one of these contact bars 16 for each lever, and each bar is fastened at its upper and lower ends by screws 17 to cross bars 18 of a frame 19 employed to carry the contact bars. This frame 19 includes side rods 20, which are concentric with the contact bars 16 and carry lugs 21 which, as shown in Fig. 1 are fastened by pins 22 to the side frames 3 of the machine. These curved rods 20 are integral with the cross bars 18. The contact bars 16 are separated from the cross bars 18 by strips 23 of insulation, the screws 17 also being suitably insulated from the contact bars. The spring contact 13 for each lever successively engages the right hand sides of the projections 24, projecting inwardly from horizontal contact bars 25, which are insulated from each other by strips 28 and extend laterally across the frame 19, and at right angles to the contact bars 16. The contact bars 25 are insulated from the contact bars 16 by insulating strips 26, and the ends of the contact bars 25, which are insulated from the side rods 20 of the frame by insulating strips 27, are firmly held in place against the side rods 20 by the contact bars 16. Each of the horizontal contact bars 25 has but one wire connected thereto, and that wire extends to a corresponding contact bar of the receiving machine as will be presently described. In the zero position of any one of the amount setting levers 1 its contact strip 13 is in contact with the projection 24 on the top contact bar 25, which is the "0" contact bar for all of the levers. When the handle of any lever (which handle is at the end opposite to that bearing the spring contacts 12 and 13) is pulled upward to adjust the lever to some other position, its contact strip 13 is lowered to successively contact with the projections 24 of the various contact bars 25 common to all the levers, while the other contact strip 12 is continuously in contact with the contact bar 16 to whatever position the lever is adjusted, so that each of these contact bars 16 can be properly said to constitute the "common" for the bank of contacts for its lever. This common contact bar has attached to it a common lead wire, so that the current furnished from a battery or other source of electric energy upon operation of a system flows through the common contact bar 16, spring contact 12, spring contact 13, and then to the particular contact bar 25, whose projection 24 is in engagement with contact strip 13 on the particular lever and this arrangement of the contact bars 16 and 25 is repeated at the receiving machine, as will be presently described, so that the position of the setting levers of the sending machine may control the extent of movement of the differential mechanism of the receiving machine.

In the illustrated form disclosed in this application the spring contact strip 12 on the special lever 10 constantly engages its common 16. When the lever is in normal position the other contact strip 13 is in contact with one of the projections 24 on the "8" contact bar 25, and the lever is adapted to be adjusted so that its contact 13 is carried into contact with the "9" contact 25.

*Sending machine locking mechanism.*—In order to aline the indicators 4 so that the indicating numerals will always be left in proper alinement, and for the further purpose of locking the setting levers, and the parts controlled thereby, during the operation of the sending machine, locking and alinement pawls 30 are provided, there being one pawl for each setting lever. These pawls are bell crank in form, and are loosely mounted upon a cross shaft 31, which is supported by the side frames 3 of the machine. The rear end of each pawl is provided with a wedge-shaped downwardly projecting nose 32, which coöperates with a series of V-shaped alining notches 33 formed on the alining disk 7. A cross bar 34 passes over the upper edge of the rearwardly extending arms of the bell crank levers 30 and the bar is normally out of engagement, so that the bell cranks may be rocked upward by the notches 33 upon adjustment of the levers. Springs 35, connecting the downwardly extending arms of the pawls 30 and a cross rod 36, are tensioned to normally retain the noses 32 of the pawls 30 in engagement with any of the notches 33 on the disks 7. The cross bar 34 is supported at its ends by two arms 37, which are rigidly mounted near the ends of the shaft 31. Extending downwardly from shaft 31, and rigid therewith, is an arm 38, which at its lower end carries an anti-friction roller 39 for coöperating with a locking disk 40 rigidly secured to a rotation shaft 41. The locking disk 40 has a notch 42 formed in its periphery, and the notch is normally in such a position that the roller 39 rests therein. A spring 43 which is connected at one end to a stud 44 projecting from one of the arms 37 and at the other end to a pin 451 projecting from the frame 3 of the machine, normally holds the roller 39 in the notch 42 of the disk 40, so that the cross bar 34 is held in elevated position above bell crank pawls 30. As soon, however, as the shaft 41 is rotated by a crank handle or any suitable means (not shown), far enough so that the solid periphery of the disk 40 coöperates with the roller 39, the shaft 31 will be rocked to lower the cross bar 34 into engagement with upper edges of the locking pawls 30 to retain the alining noses 32 in engagement with the alining notches 33 until the shaft 41 has completed its rotation, when the spring 43 will again raise the bar 34 to normal position. From this construction, it can be seen that it is impossible to move any of the setting levers 1 or 10 during the operation of the machine, the rotation shaft 41 being given one rotation at each operation.

It will be evident that the sending machine might be supplied with any desired form of registering mechanism which could be operated during the rotation of the shaft 41. In the drawings, the sending machine is not shown as being provided with printing mechanism, but it might be mentioned here that the printing mechanism for the receiving machine (shown in Fig. 8 of the drawings) is so constructed that it can be applied to the sending machine without any change whatever. In such a case, type carriers 74 of the printing mechanism for the receiving machine would be mounted on the sleeves 5 and shaft 6, and the impression means would be operated from the driving shaft 41. This printing mechanism is not shown in the drawing as attached to the sending machine, as it would necessitate the filing of an extra figure, and would not in any way add to the understanding of the invention.

In order to prevent an operation of the setting levers 1 and 10 of the sending machine before the receiving machine has completed its operation, a bell crank lever 45 is provided. This lever is mounted upon a cross rod 46, and at the upper end of its upwardly extending arm 460, carries an anti-friction roller 47, which is held in engagement with the periphery of a nearly circular cam disk 48 by a tensioned spring 49, which is connected at one end to an arm 460 of the bell crank lever, and at its opposite end to a pin 50 extending from frame 3 of the machine. The cam disk 48 is rigidly mounted on the rotation shaft 41. An electromagnet 51, supported by a bracket 52 mounted on the base 53 of the machine, is energized at the beginning of the operation of the receiving machine to draw its armature 54 forward against the tension of its spring 55, so that the upper end of the armature is under the rearwardly extending arm 56 of the bell crank lever 45. This electromagnet is controlled by the receiving machine, as will be presently described in connection with the electric circuits, in such a manner that it is deënergized only at the end of the operation of the receiving machine, and then the spring 55 draws the armature 54 away from under the arm 56, to permit movement of the bell crank lever 45. From this construction it is evident that the sending machine cannot complete its operation until after the receiving machine has completed its operation, for when the projection 57 on the disk 48 reaches the roller 47 near the end of the rotation the disk 48 and shaft 41 cannot be rotated further unless the armature 54 has been moved away from beneath the arm 56 of the bell crank lever, and the armature, as stated, is not withdrawn until at the very end of the operation of the receiving machine.

*Receiving machine releasing switch.*— Upon operation of the sending machine a circuit is completed through a starting coil of an electromagnet in the receiving machine to release the motor for operating the receiving machine and to close the motor circuit. The circuit and starting coil for unlocking the motor of the receiving machine will be described later, but the switch employed in the sending machine for closing the circuit through this starting coil in the receiving machine may be described here. A cam disk 60, which is fast on the drive shaft 41 (Fig. 1) acts upon an anti-friction roller 61 carried at the lower end of an arm 62 which is pivoted at 63 to the side frame 3 of the machine, so as to swing the arm forward at the beginning of the operation of the sending machine. This arm 62 has an insulating block 64 attached to its lower end, and when the arm is swung forward, the block 64 presses a contact strip 65 against a contact 66 to complete a circuit through the starting coil of the receiving machine as will be presently described.

*Differential mechanism of receiving machine.*—The receiving machine, as shown in cross section in Fig. 4, has loosely mounted upon a central cross shaft 70 a plurality of differentially movable actuating segments 71, corresponding to the amount setting levers 1 of the sending machine. The actuating segments are arranged to be moved positively by the driving mechanism to distances exactly corresponding to the differential movements of the amount setting levers of the sending machine so as to enter upon either of the totalizers 72 or 73, and to set upon the type carriers 74 (Fig. 9) an amount commensurate to the value indicated by the positions of the setting lever of the sending machine. In order to control the extent of movement of these actuating segments 71 the forward end of each segment has a pair of contact strips 75 and 76 (Fig. 9) suitably insulated from the actuating segments by the insulating strips 77, and the construction of these contact strips is identical to that of the contact strips 12 and 13 on the amount setting levers of the sending machine. The contact strip 76 is constantly pressed against a common contact bar 78 (Figs. 4 and 5) for the bank of contacts of the particular actuating segment. The other contact strip 75 on each lever engages one or another of a series of projections 79 on the contact bars 80, which are common to all of the actuating segments.

The contact bars 78 and 80 are constructed and arranged respectively like the contact bars 16 and 25 of the sending machine, and these bars of the receiving machine are insulated from each other, and held in place on the cross bars 81 of a supporting frame 82 in the same manner as the contact bars of the sending machine are insulated from each other and secured to the cross bars 18 of the supporting frame 19. The corresponding contact bars of the sending machine are electrically connected to those of the receiving machine, that is to say, the common 16 for the units setting lever 1 of the sending machine is connected by a common return wire to the common 78 for the units actuating segment of the receiving machine, and so on, and the "0" or uppermost contact bar 25 of the sending machine is connected by a single wire to the "0" or uppermost contact bar 80 of the receiving machine, and so on.

The receiving machine, in addition to the amount actuating segments 71, is also provided with a special selecting segment 84 (Fig. 5), which corresponds to and is controlled by the special counter selecting lever 10 of the sending machine. The construction of this special segment 84 is similar to that of the amount actuating segments 71, except that the former has but two positions of adjustment, and is so designed that its contact strip 75 is normally in engagement with the "8" contact bar 80 and is adapted to be moved into engagement with the "9" contact bar 80.

In circuit with the corresponding commons 16 and 78 are electromagnets 86 (Figs. 4 and 5), there being one for each actuating segment 71 and one for the special segment 84, and these electromagnets are supported by brackets 87 mounted on the base 85 of the receiving machine. The armatures 88, one for each electromagnet 86, are suitably mounted on a cross rod 89, and are connected by springs 90 to a cross rod 91, these cross rods 89 and 91 being suitably mounted in the side frames of the receiving machine. The armatures 88 for the electromagnets normally support corresponding levers 92 as the armatures are normally drawn forward by their springs 90 so that their upper ends engage shoulder 93 formed on the levers 92. In the description of the receiving machine the direction in which the spring tends to draw the armatures 88 will be considered as the forward direction. The levers 92 are loosely mounted upon a cross rod 94, and the levers in front of this shaft carry laterally projecting studs 95, which normally engage the upper edges of the forwardly extending fingers 96 of locking pawls 97. These locking pawls also are mounted loosely upon the cross rod 94 beside their corresponding levers 92. The fingers 96 of the pawls are connected to the lower ends of springs 98, which at their upper ends are secured to a cross rod 99, also supported by the side frames of the machine. The springs 98 tend to rock the pawls 97 in a clockwise direction (as viewed in Fig. 4), but this movement is normally prevented by the studs 95. The noses 100 formed on the upper rear ends of the locking pawls 97 are arranged to engage any one of a series of notches 101 formed on the forward ends of their corresponding amount actuating segments 71 and a special segment 84. These amount actuating segments and the special segment 84 are driven positively to extents corresponding to the positions of the corresponding setting levers in the sending machine by operating mechanism, to be now described. Each amount actuating segment 71 below the supporting shaft 70 (Fig. 4) is provided with gear teeth 104 normally meshing with the teeth of a segment gear 105 pivoted at 106 on the rear end of the corresponding lever 92. The special segment 84 (as shown in Fig. 5,) is also provided with gear teeth 104 which mesh with a segment gear 105, but the teeth on this segment 84 and on the segment gear 105 are fewer than those on an amount actuating segment and on a corresponding segment gear, as the special segment 84 is designed to be moved but one step from its normal position while the amount actuating segments may be moved to any one of nine positions from normal. The amount actuating segments 71, as well as the special segment 84, carry plates 108, which project beyond the gear teeth 104 to prevent lateral swinging of the rear end of the levers 92 to the left so that the segment gears 105 mounted on the levers will not slide out of mesh with the gear teeth 104.

Downwardly extending arms 109, one for each segment gear 105, are pivoted at their lower ends to the forward ends of links 110, and these links at their rear ends are loosely mounted upon a tie bar 111. The tie bar 111 is supported at its ends by triangular shaped plates 112 (Figs. 4 and 5) which are loosely mounted upon a cross shaft 114 suitably journaled in the side frames of the machine. The plates 112, as shown most clearly in Figs. 4 and 5, carry anti-friction rollers 116, which play in cam grooves 117, formed in the faces of disks 118, which are rigidly mounted upon a rotation shaft 119, driven in a manner to be hereinafter described. The configuration of these cam grooves 117 is such that at the beginning of each operation of the receiving machine the tie bar 111 is carried forwardly to rotate the segment gears 105 in a clockwise direction about their pivots 106. This movement of the segment gears 105 rotates the actuating segments 71 and the special segment 84 in the reverse direction, that is, the forward ends of the segments (at the left in Fig. 4) are lowered. A restoring bar 121 normally engages the surfaces 122 on all of the segments 71 and 84 and the bar is supported at the forward ends of arms 123 fast on the shaft 114, which is rocked in a manner to be presently described at the beginning of each operation of the machine to elevate the restoring bar 121 and thereby permit movement of the segments.

As soon as the contact strip 75 on any one of the amount actuating segments 71 reaches a projection 79 on the contact bar 80, which corresponds to that contact bar 25 of the sending machine which is engaged by the contact strip 13 of the corresponding setting lever 1, an electric circuit is completed from a source of electric energy, through the common 78 for the segment, common 16 for the corresponding setting lever, these corresponding contact bars 25 and 80, and through the electromagnet 86 for the segment. Thereupon the armature 88 of the energized electromagnet 86 for the particular actuating segment is drawn rearward out of engagement with the shoulder 93 on the lever 92, so that the rear end of the lever 92 may drop downward to disengage its segment gear 105 from the teeth 104 of the actuating segment 71. At the same time the spring 98 forces the upper end of the locking pawl 97 rearwardly, the stud 95 having been raised by the downward movement of the rear end of the lever 92, and hence the nose 100 of the pawl engages the notch 101 which has been brought opposite the nose of the pawl, and in this manner the movement of the actuating segment 71 is arrested at the same time that its driving segment gear 105 is disengaged from the gear teeth 104, the segment gear being permitted to continue its rotation after such disengagement. It is evident that the special segment 84 has a similar operation, only the special segment 84 is adapted to receive but one movement from normal position. If an amount setting lever 1 or the special counter selecting lever 10 of the sending machine has not been adjusted out of its home position, a circuit will be completed through the corresponding electromagnet 86 in the receiving machine before the segment gear 105 controlled by the magnet, begins its rotation, so that the corresponding locking pawl 97 may be moved to lock the corresponding actuating segment 71 or special segment 84 against movement, and the segment gear 105 at the same time drops out of engagement with gear teeth 104 on the particular segment which has not been moved out of home position. A shaft 130 extends across the machine below the rear end of levers 92, and forms a stop for the levers when they are lowered to disengage the segment gears 105 from the teeth 104 on the segments 71 and 84.

While the actuating segments 71 and the special segment 84 are in their set positions a printing impression is made by the printing mechanism, as will be later described, and then the segments 71 and 84 and the segment gears 105 are restored to their normal positions shown in Fig. 4. To accomplish this restoration the locking pawls 97 are first rocked back to normal position so that their noses 100 are carried out of engagement with the notches 101 in the segments 71 and 84. The segments are then returned to their normal or zero position, and finally the segment gears 105 are elevated into engagement with the gear teeth 104, these segment gears 105 having been rocked back in normal position relative to the carrying levers 92 by the cam grooves 117 before this normal engagement is effected. A cross rod 132 passes under the rearwardly extending fingers 133 of the locking pawls 97 and this bar is supported at the forward ends of two arms 134 rigidly mounted on shaft 130. The rearwardly extending arm 135 of one of the arms 134 carries at its rear end an antifriction roller 136 which rides on the periphery of a cam disk 137 (Fig. 4) rigidly mounted on the shaft 119. The construction of this cam disk is such that after the printing mechanism has been operated to take a printing impression, the roller will be forced downward, as it passes into engagement with the circular portion 138 of the cam periphery, to rock shaft 130, so that the cross rod 132 will be elevated to rock the pawls 97 out of engagement with notches 101, but this cross bar is not elevated at this time sufficiently to elevate the levers 92 to normal position. The segments 71 and 84 are then restored to normal position by the restoring bar 121 which is operated in the following manner. The right hand arm 123, supporting the restoring bar 121, carries a roller 139 as shown in Fig. 4, and this roller engages in a cam groove 140 formed in a disk 141 mounted on a shaft 142, which is given one complete rotation at each operation of the machine, as will be presently described. The cam groove 140 is so designed that the restoring bar 121 is raised at the beginning of each operation of the receiving machine to permit movement of the segments 71 and 84, and after the noses 100 of the pawls 97 are disengaged from the notches 101 in the segments, the restoring bar 121 is again lowered to normal position, and during this movement it engages the edges 122 of the displaced segments and restores them to normal position. After these segments 71 and 84 have been restored to normal position in this manner the restoring rod 132 is elevated still higher by the coöperation of the circular portion 143 of the cam disk 137 with the roller 136 to elevate the rear ends of the levers 92 to normal position so that the segment gears 105, which in the meanwhile have been rocked rearward to normal position, again mesh with the gear teeth 104 of their corresponding actuating segments 71 and special segment 84. It is evident that movement of the segments 71 and 84 from adjusted position breaks the electric circuits through the corresponding commons 16 and 78 of the receiving and sending machines, but as a circuit through the "0" contact bars 25 and 80 and the corresponding commons 16 and 78 cannot be broken in this manner when a segment 71 or 84 is not moved from normal position, this restoration of the segment gears 105 into engagement with the gear teeth 104 is not effected until near the very end of the operation of the machines, and after a switch which is to be described later and which is in these circuits, has been broken so that the armatures 88 may be drawn forward to normal position by their springs 90 to bring them under the shoulders 93 of the levers 92.

*Totalizer mechanism.*—Each of the amount actuating segments 71 is provided with a segmental portion 151 which carries teeth 152 constantly meshing with the teeth of a corresponding pinion 153. The special segment 84 is also provided with a segmental portion 150 (Fig. 5) which is similar to the segmental portions on the amount actuating segments except that it has fewer teeth which mesh with a corresponding pinion 153. One of these pinions 153 is rigidly mounted upon a shaft 154, while the remaining pinions are fast to the concentric sleeves 155 mounted to rotate about the shaft 154 (Fig. 5). This shaft and the sleeves 155 carry on their opposite ends the type carriers 74 of the printing mechanism, which is shown in Figs. 8 and 9 and will be described later. The shaft and these sleeves carry alining disks 156 which are similar to the alining disks 7 of the sending machine. The bell crank levers 157, loosely mounted on a shaft 158 are also similar to the bell crank levers 30 of the sending machine, and their downwardly extending noses coöperate with the alining notches 160 in the disks 156 to aline them in the proper positions, the springs 161 which connect the downwardly extending arms of the levers 157 to a cross rod 169 being provided to force the noses in the notches.

The receiving machine has mounted in suitable guide bars 162, extending across the top of the machine, a series of rack bars 163, and each bar has a set of teeth 164 on its downwardly projecting portion 165, and the teeth mesh with a corresponding pinion 153. It can, therefore, be readily seen that these racks are arranged to be moved rearwardly by the actuating segments 71 to the same extent as the corresponding amount setting levers of the sending machine. A rack bar is not provided for the special segment 84, as this segment is only employed to select one of the totalizers 72 or 73 (Fig. 4) for operation, and to set up a special type carrier 166 (Fig. 9). Each of these amount racks 163 has on its upper surface two sets of rack teeth 167 and 168, the set of teeth 167 being arranged to actuate a totalizer 72 (Fig. 4), which will be called totalizer No. 2, and the other set of teeth 168 is arranged to actuate the other totalizer 73, which will be called No. 1. After the racks 163 have been set and the printing impression has been taken from the type carriers, the particular one of these totalizers, which it is desired to operate, is lowered into mesh with its corresponding rack teeth so as to be operated during the restoring movement of the rack bars to normal position, which is effected by restoring bar 121 as has been already described.

The totalizers No. 1 and No. 2, and the method of rocking them into engagement with their sets of corresponding teeth 167 or 168 will now be described. The totalizer wheels 170 of each totalizer are loosely mounted upon a corresponding shaft 171, which extends across the racks 163 and is carried by the totalizer frame, comprising side plates 172 (Fig. 5) mounted to rock upon one of the rods 173, which are supported by the side frames of the machine. The left hand side plate 172 of each totalizer frame has a downwardly extending arm 174 which carries a pin 175, to which one end of a tensioned spring 176 is attached, the opposite end of the spring being secured to a pin 177 on a trip pawl 178. These pawls 178, one for each totalizer, are pivoted at 179 to the side plates 172 of their totalizer frames, and each has a shoulder 180, which normally engages the under side of the totalizer shaft 171 to hold the totalizer wheels out of engagement with their set of rack teeth on the rack bars 163. The totalizer frame for totalizer No. 2 is shown in normal position in Fig. 5, and the totalizer frame for totalizer No. 1 is shown in operated position. Each pawl 178 is provided with a shoulder 181, which is normally engaged by the outer end of an armature 182 of a corresponding electromagnet 183. The electromagnets 183, there being one for each totalizer, are mounted in the brackets 184, and the springs 185, which connect the armatures 182 with the pins 186 projecting from the brackets 184, normally retain the armatures in engagement with the shoulders 181 on the trip pawls 178. The side plate 172 of each totalizer frame is also equipped with a roller 187 which normally rests on a reciprocatory restoring bar 188, mounted upon the guide bars 162, and these rollers are provided to act as stops so that the springs 176 cannot elevate the totalizers past normal position. Whenever one of the electromagnets 183 is energized, it draws its armature 182 downwardly out of engagement with the shoulder 181 upon the trip pawl 178 for its corresponding totalizer and permits the tensioned spring 176 to immediately pull the forward end of the trip pawl downward about its pivot 179.

It is clear from this construction that the spring 176 will pull the released trip pawl down into engagement with a pin 189 on the restoring bar 188 faster than the force of gravity will draw the totalizer frame downward. When one of the pawls 178 is pulled downward in this manner, the bar 188 is in normal position, and in this position of the bar, the pin 189 is out of the path of movement of the shoulder 190 on the pawl so that the pawl may be pulled downward until its finger 191 engages the pin 189. As soon as one of the pawls has been pulled downward, the restoring bar 188 is moved slightly rearward to the position shown in Fig. 5. It can be seen from this figure that when the restoring bar 188 is moved to this position, one of the pins 189 will engage the vertical face of the shoulder 190 of the trip pawl 178 which has been drawn downward and bodily move the pawl rearward, in this manner rocking the totalizer frame about its shaft 173 to insure the engagement of the totalizer wheels with their set of corresponding rack teeth on the rack bars 163, before the restoring movement of the rack bar has begun. It might be well to note here that the trip pawls 178 could be dispensed with, and that the side plates 172 could be provided with projections similar to the downwardly extending arms of the trip pawls. The armatures 182 would then be arranged to coöperate directly with these projections, and when an armature was drawn downward a spring could be employed to pull the selected totalizer into mesh with the actuating racks. The present construction disclosed herein is preferable, however, as the armatures 182 are required to hold the totalizers out of mesh with their actuating racks only against the force of gravity, whereas if the trip pawls 178 were dispensed with, the armatures would have to support the totalizers against the action of their springs, as well as against the force of gravity.

The arrangement of the circuits for energizing these electromagnets 183 will be described in connection with the diagrammatic view of the circuits, but it may be well to state here that when the special lever 10 of the sending machine is in such position that its contact strips 13 engages with "8" contact bar 25, that is, the second contact bar from the bottom, the electromagnet 183 for totalizer No. 1 will be energized during operation of the sending machine, a circuit being completed from the battery or other source of electric energy through the common 78 for the special segment, a contact block 195, (see Figs. 4 and 5) electromagnet 183 for totalizer No. 1, and then back to the battery. When the setting lever 10 of the sending machine is in its other position of adjustment, that is, when the contact strip 13 is in engagement with the "9" contact bar 25, the special segment 84 of the receiving machine is moved to a like position, and then during the operation of the receiving machine a circuit is closed from the battery through the common 78, a contact block 196, electromagnet 183 for totalizer No. 2, and then back to the battery. The contacts 195 and 196 are small square blocks of conducting material, which are suitably mounted on the common 78 for the special segment so that their right hand side faces are flush with the right hand side of the common 78, and these contact bars are insulated from each other and from this common 78. The contact strip 76 on the special segment 84 is so shaped (Fig. 9) as to be constantly in engagement with the common 78 and normally in engagement with the contact 195. Upon movement of the special segment to the lower of its two positions the contact strip 76 is carried into engagement with the contact block 196. The purpose of providing these extra contacts 195 and 196 will be described in connection with the circuits. It is only necessary to close these circuits through the electromagnets 183 for a time sufficient to permit the armatures 182 to be pulled downward, but it is essential that these circuits be closed while the printing impression is being taken and before restoration of the special segment 84 is begun, for if this segment has been moved to its lower position, the No. 2 totalizer would be selected for operation and then when the segment was restored to normal position, a circuit would be made through the electromagnet 183 for the No. 1 totalizer, and, of course, it is essential that such an operation should not take place. Furthermore, it is evident that the electromagnets should be deënergized so that their armatures may engage with their trip pawls 178 when these pawls are restored to normal position, so that the totalizers will be held out of mesh while the restoring bar 188 is moved back to its normal position. To avoid these difficulties a switch is provided for these totalizer magnet circuits, and this switch may, for convenience, be referred to as the totalizer switch, and its position in the circuits will be explained more definitely in connection with the various circuits. The mechanical construction of this switch is shown in Fig. 7. The cam disk 206 is rigidly mounted upon the rotation shaft 142, and the periphery of the disk coöperates with the roller 207, carried by switch arm 208, loosely mounted on the cross rod 158. The arm 208 carries an insulating strip 209 which presses upon a contact strip 210, beside which are two other contact strips 211 and 212 suitably insulated from each other, and from the strip 210. After the actuating racks 163 have been positioned and before the restoring movement is begun, the disk 206 causes the arm 208 to press all three contact strips 210, 211 and 212 together for an instant and before the racks have begun their return movement. These contact strips have conducting wires attached to them to complete the circuits to the electromagnets 183, as will be explained more fully in connection with the diagrammatic view of Fig. 10.

The operated totalizer is restored to normal position out of engagement with the rack bars 163 by means of the restoring bar 188 in a manner now to be described. The bar 188 is reciprocated at each operation of the machine by a rock lever 214, which is loosely mounted on the shaft 142. At its lower end, the lever 214 carries an antifriction roller 215, which plays in a cam groove 216 (shown in dotted lines in Fig. 5) formed in the face of a disk 217 rigidly mounted on the shaft 119. At its upper end the lever 214 carries a pin 218, which works in a slot 219 formed in the restoring bar 188. The cam groove 216 is so designed that the bar 188 is first moved rearward to rock the selected totalizer into engagement with the actuating racks, as has been described above, and after the selected totalizer has been actuated, the restoring bar 188 is carried back forward past its normal position. Upon this forward movement of the bar a stud 220 projecting laterally from the bar engages the edge of the downwardly extending arm of the trip pawl 178 and thereby rocks the forward end of the pawl upward to carry the totalizer back to normal position out of engagement with the actuating racks. Before the bar 188 is given this forward movement by the lever 214 the electromagnet 183 for the operated totalizer is deënergized, the shape of the disk 206 being such that the circuit through the magnet is broken before this movement of the bar is begun. Therefore, when the displaced pawl 178 is moved back to normal position, the spring 185 raises the forward end of the armature 182 into an engagement with shoulder 181 on the pawl to hold the totalizer out of engagement with the actuating racks 163 until its electromagnet 183 is again energized at another operation of the machine.

Transfer mechanisms for the totalizers are not shown in the drawings as any of the well known forms of transfer mechanism may be employed.

*Printing mechanism.*—The printing mechanism of the receiving machine is shown in Figs. 8 and 9, and as already explained above, a duplicate of this printing mechanism can be employed in the sending machine. In Fig. 9 the inking ribbon is removed to expose the type carriers 74 and 166 to view. The amount type carriers 74 and the special type carriers 166, are set to extents corresponding to the positions of the setting levers 1 and 10 of the sending machine by the movement of their corresponding segments 71 and 84 of the receiving machine, as has already been fully described. These type carriers are adapted to print upon a check strip 222, which is fed from a supply roll 223 then under the roller 224, through the guide 225 between coöperating feed disks 226 and 227, between the platen 228 and the type carriers, and then through the chute 229 and opening (not shown) in the cabinet of the machine. The feed disks 226 are rigidly mounted on the shaft 142 and coöperate with the two feed disks 227 which are fast on a sleeve 234 rotatably mounted on a rod 232 carried by the side plates 233 of the printer frame. The shaft 142 near the left hand side plate 233 carries a gear 248 meshing with a gear 249 fast on the sleeve 234 so that upon each complete rotation of the shaft 142, the feed disks 226 and 227 will be given one rotation to feed the paper strip.

The platen 228 is carried by a platen arm 221 fast to a hub or sleeve 238 which is mounted on a cross rod 239, supported by the side plate 233 of the printer frame. A cam 235 is formed on the sleeve 234 to operate with the platen arm 221 upon rotation of the sleeve. The cam 235 coöperates with a projection 236 on the platen arm 221 to cause the arm to be rocked rearward and thereby gradually tension a spring 237 connecting the platen arm to a stud 238 projecting from the side frame of the machine. The cam 235 is so arranged on the sleeve 234 that after the type carriers have been positioned, and before their restoring movement is begun, the point on the periphery of the cam, which is the greatest distance from the axis of the rod 232 will pass out of engagement with the projection 236 on the platen arm to permit the spring 237 to draw the platen arm downward, whereby the platen 228 carries the check strip 222 against the type carriers to take an impression therefrom.

The inking ribbon 240 is of a continuous type and passes over the guide rollers 241, loosely mounted on cross rods 242, which are suitably mounted in the side plates 233 of the printer frame. A Geneva stop 243 is rigid with one of these rollers 241, and this Geneva stop is designed to coöperate with the two teeth 245 formed on a disk 244 which is fast on the shaft 142. One of the curved portions 246 between the teeth 247 on the Geneva stop 243 normally engages the periphery of the disk 244, but near the end of the rotation of the disk 244 the two teeth 245 on the disk engage one of the teeth 247 to rotate the Geneva stop 243 and the roll 241, in order that the inking ribbon 240 may be slightly advanced.

*Releasing mechanism for receiving machine.*—The method of unlocking and starting the receiving machine upon operation of the sending machine may now be described. Situated on the left hand side of the receiving machine is an electro magnet 251 (Fig. 8), the armature 252 of which is pivoted at its upper end to an arm 254 of a bell crank lever 255, loosely mounted on a rod 256 projecting from the side frame of the machine. On the free end of the downwardly extending arm 257 of the bell crank 255 is a pin 258, upon which rests a shoulder 259 formed on the outer end of a contact making arm 260, which is fast to the left hand end of the shaft 70. A spring 261 which is secured at its upper end to the arm 260, and at its lower end to a pin 262 projecting from the side frame of the machine is under tension and normally tends to draw the arm 260 downward to rock the shaft 70. A spring 263 which is connected at its opposite ends to the arm 257 of the bell crank 255 and to the side frame of the machine, normally holds the bell crank 255 and the armature 252 in the position shown in Fig. 8, so that the pin 258 is normally in engagement with the shoulder 259 on the arm 260, and this engagement normally prevents the spring 261 from drawing the arm 260 downward. The electro magnet 251 when energized raises its armature 252 to rock the bell crank 255 against the tension of the spring 263, whereby the pin 258 is carried away from the shoulder 259 on the arm 260 to permit the spring 261 to draw the arm 260 downward for the purpose of rocking the shaft 70. The closing of the circuit through this electro magnet 251 is effected upon operation of the sending machine by the bringing of the contact strip 65 (Fig. 1), in the sending machine, into contact with the contact block 66 this being accomplished by the cam 60 through the arm 62, as hereinbefore fully described. This circuit will be more fully described in connection with the description of the circuits of the system.

The arm 260 carries an insulating strip 265, and when the arm 260 is rocked downward by its spring 261, the strip 265 presses the upper contact strip 266 (Fig. 6) of a switch against the lower contact strip 267, and these contact strips are in circuit with the battery, which, in the illustrated form shown herein, is a source of electric energy between the banks of contacts of the sending and receiving machines. It is necessary to have this switch in circuit with the contact bars of the receiving and sending machine so that circuits will not be completed through the "0" contact bar 25 of the sending machine and the "0" contact bar 80 of the receiving machine when the system is not in operation. A closed circuit would evidently be established between these "0" contact bars of the two machines whenever one or more setting levers of the sending machine were in zero position, as the amount actuating segments of the receiving machine are normally in zero position. The establishment of a contact between the two contact strips 266 and 267 as just described also completes the circuit through the electromagnet 51 of the sending machine, so that upon beginning of the operation of the receiving machine, the armature 54 is drawn by the electromagnet 51 under the arm 56 of the bell crank 45. When the armature 54 is in this position, the rotation of shaft 41 of the sending machine cannot be completed, as the projection 57 on the disk 48 cannot pass the roller 47 until the armature 54 is moved away from under the arm 56, as has been described in connection with the sending machine.

The motor is not shown in the drawing as its showing is not necessary to the understanding of the invention, and any one of the well known forms can be readily employed. A top plan view of the motor clutch, however, is shown in Fig. 9. This clutch is of a well known type, and will be described but briefly here. A small gear wheel 269 is rigidly mounted on a sleeve 270 (Figs. 6 and 8) rotatably mounted on the right hand end of the rotation shaft 142. A disk 271 is loosely mounted on the sleeve 270 and the sleeve carries fast thereon a clutch member which is not shown in the drawings, but is mounted within a hollow clutch member 272, loosely mounted upon shaft 142. This clutch member 272 is rigid with the gear element 273, which is adapted to mesh with a worm wheel (not shown) rigid with the motor armature. Rigidly mounted on the shaft 70 is an arm 274 (Fig. 6) which is provided with a projecting portion 275 for engaging a block 276 on the disk 271 and shoulders on two disks 278. When the shaft 70 is rocked in the manner described above the projecting portion 275 is carried away from engagement with the disks 271 and 278. Relative movement between the disks 278 is effected by a spring (not shown) to connect the clutch members together, so that when the clutch member 272 is rotated by the armature of the motor, the gear wheel 269 will also be rotated. The gear 269 meshes with a large gear wheel 280, rigidly mounted upon the rotation shaft 119. The gear wheel 280 has three times as many teeth as the small gear wheel 269, and the latter at each operation of the machine is given three rotations to give one complete rotation to the gear wheel 280 and shaft 119. The shaft 119 also carries fast thereon a gear wheel 281, which meshes with a gear wheel 282, which is of the same size as the gear wheel 281 and fast upon the shaft 142, and in this manner one complete rotation of the shaft 119 effects one complete rotation of the shaft 142.

The disk 271, as shown in Fig. 6, is provided with a notch 283, in which a roller 284 on an arm 285 normally rests. The arm 285 is pivoted upon a stud 286, and is fast to a forwardly extending arm 287. When the projecting portion 275 of the arm 274 is rocked out of engagement with the block 276 on the disk 271, a coiled spring 288 (Fig. 9) gives the disk a slight movement about the sleeve 270, and the roller 284 is thereby forced out of the notch 283 in the disk to lower the free end of the arm 287. This free end of the arm 287 extends over a roller 290, mounted upon an arm 291, which is pivoted at 292 to the top of the motor. The arm 291 also carries an insulating block 293, which extends over a contact strip 294, and when the arm 287 is swung downward as described, it engages the roller 290 to swing the arm 291 downward thereby pressing the contact strip 294 into engagement with contact screws 295 to complete a circuit through the electric motor of the receiving machine for the purpose of operating the latter. This contact between the contact strip 294 and the contact screws 295 is continuously maintained until the shaft 119 has almost completed its rotation. A nose 296 on a disk 297, which is rigidly secured to the shaft 119 then engages a roller 298 on the lower end of an arm 299ª fast to the shaft 70 to rock the shaft 70 back to normal position. Thereupon the projecting portion 275 of arm 274 will again be in the path of the block 276 on the disks 271 and the shoulders on the disks 278. Movement of the disk 271 in this manner will be arrested, and as the notch 283 is then opposite the roller 284, the spring contact 294 raises the arm 291 and again seats the roller in the notch 283, and in this way the circuit through the electric motor is broken. The shaft 142 then moves slightly farther to complete its rotation, and the engagement of the projecting portion 275 of the arm 274 with shoulders on the disks 278 disconnects the clutch members. The rocking of the shaft 70 to normal position also raises the arm 260 to permit the contact strip 266 to rise out of contact with the contact strip 267, so that the electrical connections between the banks of contacts of the sending and receiving machines may be broken.

*Electric circuits and connections.*—Having now described the main mechanical features comprising the sending and receiving machines, the various arrangements of the electric circuits and relay devices for controlling the manipulation of the system will now be described with specific reference to the diagrammatic view, shown in Fig. 10. In this view, the sending and receiving machines are both represented diagrammatically being separated by the dot-dash line 300, the machine to the left being the sending machine, and the machine to the right the receiving machine. The main source of electric energy for supplying current to the various circuits extending between the sending and receiving machines is shown as a battery 299 stationed at the receiving machine. Upon adjustment of any of the amount setting levers 1, or the special lever 10 to the desired positions, preparatory to the operation of the system, its pair of spring contacts 12 and 13 bridges across a connection between the common 16 for the particular lever, and one of the contact bars 25, common for all the levers. This diagrammatic view shows but two banks of contacts for two amount levers, and the corresponding banks of contacts in the receiving machine as the other amount banks of contacts are but a repetition of this arrangement. The bank of contacts for the special setting lever 10 of the sending machine, and the bank of contacts for the special segment 84 of the receiving machine, are also shown in this view. As described in connection with the sending machine, the spring contacts 13 of all of the setting levers of the sending machine are adapted to make contacts with the horizontal contact bars 25, which are strips of conducting material common to all of the levers, but as these contact bars 25 cannot be conveniently shown as strips in the diagrammatical view, the contact projections 24 of the bars are shown as being connected to the single set of wires 301 by the wires 302. The corresponding contact projections 79 of the contact bars 80 in the receiving machine are also shown as being connected by wires 303 to the wires 301. In reality, the wires 301 are connected directly to one end of the contact bars 25 and extend to the receiving machine where they are connected to one end of the corresponding contact bars 80.

After the setting levers of the sending machine have been adjusted to their desired positions, the shaft 41 is rotated in any desired manner to operate the machine. This, as above described in connection with Fig. 1 effects, through the cam 60, the pressing together of the contacts 65 and 66. The bringing of these two contacts together results in making a circuit as follows: from generator 299 through wire 304, wire 305, contact 65, contact 66, wire 306 through the solenoid starting magnet 251, wire 307, wire 307ª, wire 308 back to the generator 299. The closing of this circuit through the starting magnet 251, as above explained in connection with Figs. 6 and 8, raises the armature 252 of the magnet to release the arm 260, so that the arm may be pulled downward by its spring 261, and in this manner the shaft 70 is rocked to carry the arm 274 away from the disks 278, so that the clutch members for the motor may be connected together. The disk 271 at the same time is given a slight movement to lower the arm 287 for the purpose of establishing a contact between the contacts 294 and 295. The bringing of these two contacts together closes a circuit from the battery 299 through wire 310, motor 311, contact 294, contact 295, and through wire 312 back to the source of electric energy.

The downward movement of the arm 260, upon being released by movement of the armature 252 of the energized starting coil 251 also presses the contact strips 266 and 267 together, and this establishes an electrical connection between the battery 299 and the locking magnet 51 of the sending machine for preventing a complete operation of the sending machine before the receiving machine has completed its operation. Starting again from the battery 299, it will be seen that this circuit extends from the battery 299 through wire 304, wire 305, wire 314, locking magnet 51, wire 315, wire 315ª, contact 266, contact 267, wire 316, wire 308, back to the battery. The energizing of the magnet 51 results in the movement of its armature 54 under the arm 56 of the bell crank 45 to prevent the projection 57 on the disk 48 from passing the roller 47 on the bell crank 45 until the circuit is broken by the restoration of the arm 260 to normal position, which is accomplished by the cam 297, as described in connection with Fig. 6.

The battery 299 also furnishes the source of energy for the circuits between the banks of contacts of the receiving and sending machines, and these connections between the bank of contacts will be traced by way of an example. If an amount setting lever 1 is adjusted to its "9" position, a contact is established by means of the contact strips 12 and 13 between the "9" contact bar 25 and the common 16 for that particular lever. When the corresponding actuating segment 71 of the receiving machine reaches its "9" position, a contact is made across the "9" contact bar 80, and the common 78 for the segment. This results in a circuit being made as follows: from the battery 299, through the wire 304, wire 317, wire 318, common 78, "9" contact bar 80 (which in a diagrammatic view is represented by the projection 79 and wire 303), wire 301, "9" contact bar 25, (represented by a projection 24 and a wire 302) common 16, common return wire 319, electromagnet 86, wire 320, wire 321, wire 315ª, contact 266, contact 267, wire 316, wire 308 back to the battery. The closing of this circuit energizes the electromagnet 86 to operate the locking pawl 97, for the purpose of stopping and locking the actuating segment in its "9" position, and to effect a disengagement of the driving segment gear 105 from its teeth 104 on the actuating segment. These contacts 266 and 267 constitute switch terminals for the commons 16 and 78 of the sending and receiving machines, and are broken by the restoration of the arm 260 to normal position near the very end of the operation of the receiving machine, as already described. The various circuits through any of the corresponding banks of contacts are similar to that just described, and it is considered unnecessary to give any further example. As a common return wire 319 for each bank of contacts of the sending machine is provided it is obvious from this arrangement of the electric wiring that each bank of contacts of the sending machine can only control the actuating segment for the corresponding bank of contacts in the receiving machine, although the common wires 301 may be used simultaneously by different banks of contacts.

In the diagrammatic view, only the contact points of the "8" and "9" contact bars 25 for the special setting lever 10 of the sending machine are shown, as this lever is adapted to be adjusted to only these positions. The corresponding contact points of the "8" and "9" contact bars 80 of the receiving machine are similarly shown in this view. As the circuits, which are established between these contact bars and the commons 16 and 78 for the setting lever 10 and special segment 81, are similar to the circuits established through the corresponding amount banks of contacts, these circuits will not be described in detail.

Circuits through the electromagnets 183 which normally hold the totalizers No. 1 and No. 2 out of engagement with the actuating racks may now be described. When the contact strip 75 on the special segment 84 remains in contact with the "8" contact bar 80, corresponding to the position of the special lever 10 of the sending machine, a contact is made by the contact strip 76 between the common 78 for the special segment and the contact block 195. A circuit is then completed through the electromagnet 183 for the No. 1 totalizer, this circuit being made as follows: from the battery through wire 304, wire 317, wire 326, wire 328, common 78, contact 195, wire 322, electromagnet 183 for the No. 1 totalizer, wire 323, contact 212, contact 211, contact 210, wire 324, wire 325, wire 325ª, wire 321, wire 315ª, contact 266, contact 267, wire 316, wire 308, back to the battery. To select totalizer No. 2, the special segment 84 is moved under control of the special lever 10 of the sending machine so that its contact strip 76 engages the common 78 for this segment and the contact 196, a circuit thereby being completed as follows: from battery 299, through wire 304, wire 317, wire 326, wire 328, common 78, contact 196, wire 327, 328, electromagnet 183 for totalizer No. 2, wire 329, contact 211, contact 210, wire 324, wire 325, wire 325ª, wire 321, wire 315ª, contact 266, contact 267, wire 316, wire 308, back to the battery.

The totalizer switch, comprising the three contact strips 210, 211 and 212, as already described in reference with Fig. 7 is closed by the cam 206 after the segment gears 105 have completed their counter-clockwise movement. The switch is closed but for a short time, so that the armature 182 of the electromagnet, which was energized, may be raised by its spring 185 into engagement with the shoulder 181 of the displaced pawl 178 when the pawl is restored to normal position by the bar 188, so that the operated totalizer will be held out of engagement with the actuating racks until selected for operation at another operation of the system.

The purpose of providing the contact blocks 195 and 196 and connecting the wires 322 and 327 respectively thereto instead of connecting these wires to the "8" and "9" contact bars 80, will now be evident in view of the above described circuits. If the wires 322 and 327 were connected to these "8" and "9" contact bars 80 the circuits through the electromagnets 183 would be controlled by any of the amount setting levers when any one of these levers is moved to its "8" or "9" position and therefore if any one of these amount setting levers is adjusted so that its contact strip 13 is in engagement with either the "8" or "9" contact bar 25 and the contact strip 13 on the special lever is in engagement with the other one of these contact bars, circuits would be complete through both of the electromagnets 183 and both totalizers would be operated. To make this clearer these circuits, which might be established at the same time through the electromagnets if the contacts 195 and 196 were not provided, may be traced in the diagrammatic view. If one of the amount levers was adjusted to its "9" position then a circuit would be completed as follows: from the battery, through wire 304, wire 317, wire 318, common 78 for the amount actuating segment 71, corresponding to the particular amount lever adjusted to its "9" position, "9" contact 80, wire 327 (if this wire was connected to the "9" contact bar 80 as assumed in this example) electromagnet 183 for totalizer No. 2, wire 329, contact 211, contact 210, wire 324, wire 325ª, wire 321, wire 315ª, contact 266, contact 267, wire 316, wire 308, back to the battery. Now if the special lever 10 has been left in its normal position, that is, so that its contact strip 75 engages the "8" contact bar 80, a circuit through the electromagnet 183 for totalizer No. 1 would be identical to the circuit for this electromagnet described above as passing through the contact 196 except that this circuit would pass directly through the wire 322 from the "8" contact bar 80, if this wire was connected to this bar. It can therefore be seen that if the wires 322 and 327 were connected directly to the "8" and "9" contact bars 80, the amount levers of the sending machine would control the energizing of the magnets 183 for the totalizers, whereas it is intended that only the special lever 10 should control these electromagnets. By providing the contact blocks 195 and 196 only the special lever of the sending machine controls these electromagnets as a circuit through either one of these contact blocks (and therefore through either of the electromagnets) can be established only when the contact strip 76 of the special segment 84 is in engagement therewith, and the position of the special segment is controlled only by the special lever of the sending machine.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with an accounting device; of an actuator for operating the same; a driving member for said actuator normally connected thereto; a magnet mounted independently of said actuator for disconnecting said driving member from said actuator after the actuator has been moved to any desired position by the driving member; and means for energizing said magnet.

2. In a machine of the class described, the combination with an accounting device; of an actuator for operating the same; a driving member for said actuator, normally connected thereto; a magnet mounted independently of said actuator for controlling the disconnecting of said driving member from said actuator after the actuator has been moved to any desired position; a projection operable to stop said actuator in its desired position and controlled by said magnet; and means for energizing said magnet.

3. In a machine of the class described, the combination with an accounting device; of an actuator for operating said device and having a normal position; an operating member for positively driving said actuator to differential extents; an electromagnet mounted independently of said actuator; devices actuated thereby for causing obstruction of said actuator; contact means moved by said actuator; a plurality of stationary contacts with all of which said contact means may engage; and a circuit for said contact means and including said magnet.

4. In a machine of the class described, the combination with an accounting device; of an actuator therefor; a segment gear having an invariable extent of movement for driving said actuator and normally in engagement therewith; a lever for carrying said segment gear; a magnet having an armature normally supporting said lever; and means for controlling the energizing of said magnet so that the armature may be disabled as a support for said lever to effect the disengagement of said segment gear from said actuator at different points in the movement of said segment gear.

5. In a machine of the class described, the combination with an accounting device; of an actuator therefor; a segment gear having an invariable extent of movement for driving said actuator and normally in engagement therewith; a lever for carrying said segment gear; a magnet having an armature normally supporting said lever; means for controlling the energizing of said magnet so that the armature may be disabled as a support for said lever to effect the disengagement of said segment gear from said actuator at different points in the movement of said segment gear; and a spring operated locking pawl operated, when said armature is disabled, to lock said actuator in its differential position.

6. In a machine of the class described, the combination with an accounting device; of an actuator therefor; a segment gear having an invariable extent of movement for driving said actuator and normally in engagement therewith; a lever for carrying said segment gear; a magnet having an armature normally supporting said lever; means for controlling the energizing of said magnet so that the armature may be disabled as a support for said lever to effect the disengagement of said segment gear from said actuator at different points in the movement of said segment gear; means for restoring said actuator to normal position; and means for then moving said segment gear into engagement with said actuator.

7. In a machine of the class described, the combination with an accounting device; of an actuator therefor; a segment gear having an invariable extent of movement for driving said actuator and normally in engagement therewith; a lever for carrying said segment gear; a magnet having an armature normally supporting said lever; means for controlling the energizing of said magnet so that the armature may be disabled as a support for said lever to effect the disengagement of said segment gear from said actuator at different points in the movement of said segment gear; and a locking pawl for locking said actuator in its differential position.

8. In a machine of the class described, the combination with an accounting device; of an actuator therefor; a segment gear having an invariable extent of movement for driving said actuator and normally in engagement therewith; a lever for carrying said segment gear; a magnet having an armature normally supporting said lever; means for controlling the energizing of said magnet so that the armature may be disabled as a support for said lever to effect the disengagement of said segment gear from said actuator at different points in the movement of said segment gear; a locking pawl, operated when said armature is disabled to lock said actuator in its differential position; means for moving said pawl out of locking position and for moving said segment gear into engagement with the actuator; and means for restoring the actuator to normal position after the pawl has been moved out of locking position and before the segment gear is moved into engagement with the actuator.

9. In a system of the class described, the combination with a receiving machine having a differentially movable element, a driving segment gear for driving said element, having an invariable extent of movement, and normally in engagement with said element, and means for holding said segment gear into engagement with said differentially movable element and adapted to be disabled to effect the disengagement of the segment gear and said element when the element reaches a desired position; of a sending machine having means for controlling the differential movement of the differentially movable element of the receiving machine; and electrical connections intermediate said controlling means of the sending machine and said holding means for the receiving machine.

10. In a system of the class described, the combination with a sending machine, having a plurality of banks of contacts and switch connections therefor; of a receiving machine having a plurality of corresponding banks of contacts, differentially movable members, and switch connections for its said banks of contacts, carried by said differentially movable members and controlled by the switch connections of the sending machine; and electrical connections including a set of wires extending from the sending machine to the receiving machine and common to all of the banks of contacts of either machine and a common return wire for corresponding banks of contacts.

11. In a system of the class described, the combination with a sending machine, having a plurality of banks of contacts, and switch connections therefor; of a receiving machine having a plurality of corresponding banks of contacts, simultaneously and differentially movable members, and switch connections for its said banks of contacts, carried by said differentially movable members and controlled by the switch connections of the sending machine; and electrical connections including a set of wires extending from the sending machine to the receiving machine and common to all of the banks of contacts.

12. In a system of the class described, the combination with a sending machine, having a plurality of banks of contacts, and switch connections therefor; of a receiving machine having a plurality of corresponding banks of contacts, differentially movable members, having a normal position, switch connections for its said members and controlled by the switch connections of the sending machine, and means for positively and simultaneously moving said differentially movable members from normal position to different extents; and electrical connections including a set of wires extending from the sending machine to the receiving machine and common to all of the banks of contacts of either machine, and a common return wire for corresponding banks of contacts.

13. In a system of the class described, the combination with a sending machine, having a plurality of banks of contacts, and switch connections therefor; of a receiving machine, having a plurality of corresponding banks of contacts, differentially movable members, switch connections for its said members and controlled by the switch connections of the sending machine, and means for locking said members in their differential positions; and electrical connections including a set of wires extending from the sending machine to the receiving machine and common to all of the banks of contacts of either machine, and a common return wire for corresponding banks of contacts for controlling said locking means.

14. In a system of the class described, the combination with a sending machine having a plurality of banks of contacts, and switch connections therefor; of a receiving machine having a plurality of corresponding banks of contacts, simultaneously and differentially movable members, and switch connections for its said banks of contacts, controlled by the switch connections for the sending machine, for controlling the extent of movement of the differentially movable members; and electrical connections including a set of wires extending from the sending to the receiving machine and common to all of the banks of contacts of either machine, and a common return wire for corresponding banks of contacts.

15. In a system of the class described, the combination with a sending machine having a plurality of banks of contacts and switch connections, adjustable before the system is set into operation; of a receiving machine having a plurality of corresponding banks of contacts, switch connections therefor, controlled by said switch connections for the sending machine, and an accounting device controlled by the switch connections of the receiving machine; and electrical connections including a set of wires extending from the sending to the receiving machine and common to all of the banks of contacts of either machine, and a common return wire for corresponding banks of contacts.

16. In a system of the class described, the combination with a sending machine having a plurality of banks of contacts, and switch connections therefor; of a receiving machine having a plurality of corresponding banks of contacts, simultaneously and differentially movable members, switch connections for its said banks of contacts, controlled by said switch connections for the sending machine, for controlling the extent of movement of the differentially movable members, and means for locking the differentially movable members in adjusted position; and electrical connections including a set of wires extending from the sending to the receiving machine and common to all of the banks of contacts of either machine, a common return wire for corresponding banks of contacts, and a magnet in circuit with each common return wire for operating said locking means.

17. In a system of the class described, the combination with a sending machine having a plurality of banks of contacts, and switch connections therefor; of a receiving machine having a plurality of corresponding banks of contacts, differentially movable members having a normal position, means for positively and simultaneously moving said members from normal position, switch connections for its said banks of contacts, controlled by said switch connections for the sending machine, for controlling the extent of movement of said members, and means for locking said members in their moved positions; and electrical connections including a set of wires extending from the sending to the receiving machine and common to all of the banks of contacts of either machine, a common return wire for corresponding banks of contacts, and a magnet in circuit with each common return wire for operating said locking means and controlling said driving means.

18. In a system of the class described, the combination with a sending machine having a plurality of banks of contacts, and switch devices therefor; of a receiving machine having a plurality of corresponding banks of contacts, a plurality of accounting devices, common actuators for the accounting devices, and switch devices for its said banks of contacts controlled by the corresponding switch devices of the sending machine, one being employed for selecting the desired accounting device for actuation and the others for controlling the extent of movement of the actuators; and electrical connections including a set of wires extending from the sending to the receiving machine and common to all of the banks of contacts of either machine, and a common return wire for corresponding banks of contacts.

19. In a system of the class described, the combination with a sending machine having a plurality of banks of contacts, and switch devices therefor; of a receiving machine having a plurality of corresponding banks of contacts, a plurality of totalizers, common actuators for the totalizers normally out of engagement therewith, totalizer circuits, one for each totalizer, which when closed results in engagement of the corresponding totalizers with the actuators, switch devices for its said banks of contacts controlled by the corresponding switch devices of the sending machine, one for closing a desired totalizer circuit and the others for controlling the extent of movement of the actuators; and electrical connections including a set of wires extending from the sending to the receiving machine and common to all of the banks of contacts of either machine and a common return wire for corresponding banks of contacts in the two machines.

20. In a system of the class described, the combination with a sending machine having a plurality of banks of contacts, and switch devices therefor; of a receiving machine having a plurality of corresponding banks of contacts, a plurality of totalizers, common actuators for the totalizers normally out of engagement therewith, totalizer circuits, one for each totalizer, which when closed results in engagement of the corresponding totalizers with the actuators, switch devices for its said banks of contacts controlled by the corresponding switch devices of the sending machine, one for closing a desired totalizer circuit and the others for controlling the extent of movement of the actuators; and electrical connections including a set of wires extending from the sending machine to the receiving machine and common to all of the banks of contacts of either machine, a common return wire for corresponding banks of contacts in the two machines, and a common source of electrical energy for the totalizer circuits and said electrical connections.

21. In a system of the class described, the combination with a sending machine having a plurality of banks of contacts comprising contact pieces common to all of the banks of contacts and contact pieces common to the individual banks of contacts, and switch devices therefor; of a receiving machine having a plurality of banks of contacts corresponding to the banks of contacts in the sending machine and similarly constructed, switch devices for its said banks of contacts, a plurality of registering mechanisms selected for actuation by one of the switch devices of the receiving machine, and common actuators for the registering mechanisms controlled by the other contact devices of the receiving machine; and electrical connections intermediate the corresponding contact pieces in the sending and receiving machines.

22. In a system of the class described, the combination with a sending machine having a plurality of banks of contacts comprising contact pieces common to all of the banks of contacts and contact pieces common to the individual banks of contacts, and switch devices therefor; of a receiving machine having a plurality of banks of contacts corresponding to the banks of contacts in the sending machine and similarly constructed, switch devices for its said banks of contacts, a plurality of totalizers, totalizer circuits selectively closed by one of the switch devices of the receiving machine, and common actuators for the registering mechanisms controlled by the other contact devices of the receiving machine; and electrical connections intermediate the corresponding contact pieces for the sending and receiving machines.

23. In a system of the class described, the combination with a sending machine having a plurality of banks of contacts, comprising contact pieces common to all of the banks of contacts and contact pieces common to the individual banks of contacts, and switch devices therefor; of a receiving machine having a plurality of banks of contacts corresponding to the banks of contacts in the sending machine and similarly constructed, switch devices for its said banks of contacts, a plurality of totalizers, totalizer circuits selectively closed by one of the switch devices of the receiving machine, common actuators for the registering mechanisms controlled by the other contact devices of the receiving machine; electrical connections intermediate the corresponding contact pieces in the sending and receiving machines; and a common source of electric energy for said totalizer circuits and electrical connections.

24. In a system of the class described, the combination with a sending machine having a plurality of banks of contacts, comprising contact pieces common to all of the banks of contacts and contact pieces common to the individual banks of contacts, and switch contacts for the banks of contacts; of a receiving machine having a plurality of corresponding banks of contacts, switch contacts therefor, controlled by the switch contacts of the sending machine, and accounting mechanism controlled by the switch contacts of the receiving machine; and connections intermediate the corresponding contact pieces of the sending and receiving machines.

25. In a system of the class described, the combination with a receiving machine having a plurality of registering mechanisms mounted therein, an operating mechanism for the receiving machine, and actuators common to said registering mechanisms but normally out of operative relation with all of said registering mechanisms and driven positively by the operating mechanism to differential extents; of a sending machine including adjustable elements; and means controlled by the adjustable elements of the sending machine for establishing operative relation between the actuators of the receiving machine and any one of the registering mechanisms and for disconnecting the operating mechanism of the receiving machine from the actuators after the actuators have been moved thereby to differential extents determined by the adjustable elements of the sending machine.

26. In a system of the class described, the combination with a sending machine having a plurality of banks of contacts comprising contact pieces common to all of the banks of contacts and contact pieces common to the individual banks of contacts, and switch contacts for the banks of contacts; of a receiving machine having a plurality of corresponding banks of contacts, switch contacts therefor controlled by the switch contacts of the sending machine, accounting mechanism, a plurality of differentially movable actuators for the accounting mechanism, the extent of movement of which is controlled by the switch contacts of the receiving machine, and means for simultaneously operating said actuators; and connections intermediate the corresponding contact pieces of the sending and receiving machines.

27. In a machine of the class described, the combination with a totalizer; of actuators therefor normally out of engagement therewith; a frame for said totalizer; a pawl carried by said frame; means for holding said pawl so that the totalizer is out of engagement with said actuators; a spring for said pawl; an operating bar; means for disabling said holding means whereupon said spring causes said pawl to engage said bar; and means for operating said bar whereby the bar, through the engagement of the pawl with the bar, rocks the totalizer frame to engage the totalizer and its actuators.

28. In a machine of the class described, the combination with a totalizer; of actuators therefor normally out of engagement therewith; a frame for said totalizer; a pawl carried by said frame; an electromagnet, the armature of which holds said pawl so that the totalizer is normally out of engagement with said actuators; a spring for said pawl; an operating bar; means for energizing said magnet whereupon said spring causes said arm to engage said bar; and means for operating said bar so that the bar, through its engagement with the pawl, will rock the totalizer to engage the totalizer and its actuators.

29. In a machine of the class described, the combination with a totalizer; of actuators therefor normally out of engagement therewith; a frame for said totalizer; a pawl carried by said frame; means for holding said pawl so that the totalizer is normally out of engagement with said actuators; a spring for said pawl; an operating bar; means for disabling said holding means whereupon said spring causes said pawl to engage said bar; and means for operating said bar in one direction, whereby the bar through its engagement with the pawl rocks the totalizer frame to engage the totalizer and its actuators, and in the reverse direction to move said pawl and totalizer frame back to normal position.

30. In a machine of the class described, the combination with a totalizer; of actuators therefor normally out of engagement therewith; a frame for said totalizer; a pawl carried by said frame; an electromagnet the armature of which normally holds said pawl so that the totalizer is out of engagement with said actuators; a spring for said pawl; an operating bar; means for energizing said magnet whereupon said spring causes said arm to engage said bar; and means for operating said bar in one direction so that the bar, through its engagement with the pawl, will rock the totalizer to engage the totalizer and its actuators and in the reverse direction to move said pawl and totalizer back to normal position.

31. In a machine of the class described, the combination with an accounting device; of an actuator therefor; a segment gear having an invariable extent of movement for driving said actuator and normally in mesh therewith; a lever carrying said segment gear; means for supporting said lever; and means for disabling said supporting means to effect the unmeshing of said segment gear with said actuator at different points in the movement of said segment gear.

32. In a machine of the class described, the combination with an accounting device; of an actuator therefor; a segment gear having an invariable extent of movement for driving said actuator and normally in mesh therewith; a lever carrying said segment gear; means for supporting said lever; means for disabling said supporting means to effect the unmeshing of said segment gear with said actuator at different points in the movement of said segment gear; and a pawl operated, when said supporting means is disabled, to lock said actuator in its moved position.

33. In a machine of the class described, the combination with an accounting device; of an actuator therefor; a segment gear having an invariable extent of movement for driving said actuator and normally in mesh therewith; a lever carrying said segment gear; means for supporting said lever; means for disabling said supporting means to effect the unmeshing of said segment gear with said actuator at different points in the movement of said segment gear; means for restoring said actuator to normal position; and means for moving said segment gear into mesh with said actuator after the latter has been restored to normal position.

34. In a machine of the class described, the combination with an accounting device; of an actuator therefor; a segment gear having an invariable extent of movement for driving said actuator and normally in mesh therewith; a lever carrying said segment gear; means for supporting said lever; means for disabling said supporting means to effect the unmeshing of said segment gear with said actuator at different points in the movement of said segment gear; a locking pawl, operated when said supporting means is disabled, to lock said actuator in its moved position; means for moving said pawl out of locking position and for moving said segment gear into engagement with the actuator; and means for restoring said actuator to normal position before the segment gear is moved into engagement therewith.

In testimony whereof I affix my signature in the presence of two witnesses.

MAXIMILIAN M. GOLDBERG.

Witnesses:
F. E. HAMILTON,
J. B. RICKETTS.